(12) United States Patent
Canning et al.

(10) Patent No.: US 8,346,866 B2
(45) Date of Patent: Jan. 1, 2013

(54) FORMATION OF SPECIAL INTEREST GROUPS

(75) Inventors: Simon Gilbert Canning, Upper Coomera (AU); Craig Robert William Forster, Austin, TX (US); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 12/774,120

(22) Filed: May 5, 2010

(65) Prior Publication Data

US 2011/0276629 A1    Nov. 10, 2011

(51) Int. Cl.
G06F 15/16    (2006.01)
(52) U.S. Cl. ..... 709/204; 709/205; 705/14.2; 705/14.19
(58) Field of Classification Search .......... 709/204–205; 705/14.2, 14.19
See application file for complete search history.

(56) References Cited

U.S. PATENT DOCUMENTS

| | | | |
|---|---|---|---|
| 6,567,797 B1 | 5/2003 | Schuetze et al. | |
| 6,745,178 B1 | 6/2004 | Emens et al. | |
| 6,941,321 B2 | 9/2005 | Schuetze et al. | |
| 7,822,631 B1 * | 10/2010 | Vander Mey et al. | 705/7.29 |
| 2002/0178056 A1 * | 11/2002 | Lim | 705/14 |
| 2003/0014311 A1 * | 1/2003 | Chua | 705/14 |
| 2007/0027562 A1 * | 2/2007 | de Voghelaere Parr | 700/91 |
| 2007/0061195 A1 | 3/2007 | Liu et al. | |
| 2007/0233291 A1 * | 10/2007 | Herde et al. | 700/91 |
| 2007/0288602 A1 | 12/2007 | Sundaresan | |
| 2007/0299833 A1 | 12/2007 | Viljamaa et al. | |
| 2008/0109491 A1 * | 5/2008 | Gupta | 707/104.1 |
| 2008/0162431 A1 | 7/2008 | Xu et al. | |
| 2009/0132652 A1 | 5/2009 | Athale et al. | |
| 2009/0149206 A1 | 6/2009 | De Amorim et al. | |
| 2009/0210282 A1 * | 8/2009 | Elenbaas et al. | 705/9 |
| 2010/0198836 A1 * | 8/2010 | Glass et al. | 707/748 |
| 2010/0268582 A1 * | 10/2010 | Tanaka | 705/14.4 |

FOREIGN PATENT DOCUMENTS

| | | |
|---|---|---|
| WO | 2007130918 A2 | 11/2007 |
| WO | 2008028178 A2 | 3/2008 |
| WO | 2008028178 A3 | 3/2008 |

OTHER PUBLICATIONS

Lailei Hung and Zhengyou Xia, "Measuring User Prestige and Interaction Preference on Social Network Site", 2009 Eighth IEEE/ACIS International Conference on Computer and Information Science.

* cited by examiner

Primary Examiner — Abdullahi Salad
(74) Attorney, Agent, or Firm — Yee & Associates, P.C.; Jeffrey S. LaBaw

(57) ABSTRACT

Special interest subgroups are formed by a group of participants by establishing a profile for each participant. The profile defines contribution attributes dealing with contributions the profiled participant might make to a subgroup and attribution attributes dealing with benefits the profile participant might receive from participating in the subgroup. For each possible pairing of participants in the group, an overall contribution score and an overall benefit score is calculated for each participant. A mutual benefit score is calculated by combining the benefit scores for both participants in the pair. Participants are assigned to subgroups as a function of participant contribution and mutual benefit scores.

17 Claims, 8 Drawing Sheets

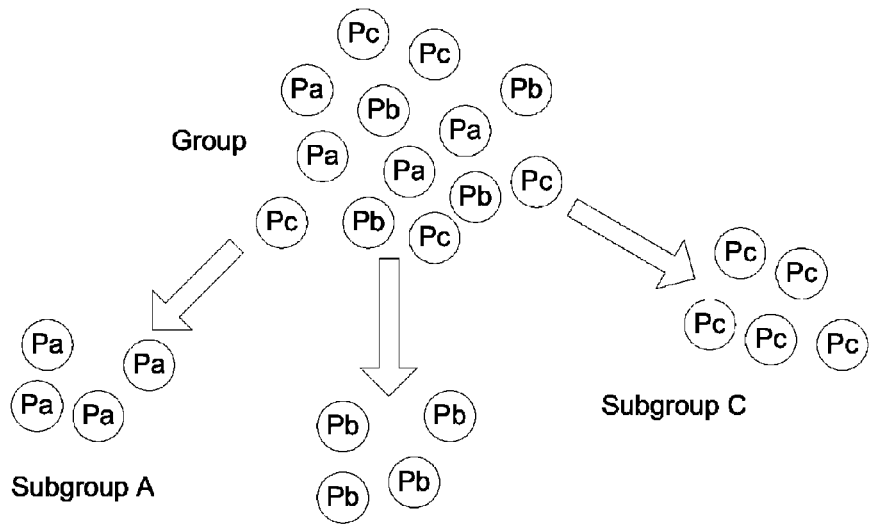

FORMATION OF SPECIAL INTEREST GROUPS

BACKGROUND

The present invention relates to formation of groups of individuals and more particularly to the formation of groups of individuals having shared special interests.

Conferences are often attended by relatively large groups of individuals who know little in advance about the other individuals who attending the same conference. Even where the primary purpose of the conference may be to provide one or more major presentations to the entire group attending the conference, conference organizers often wish to organize subgroups of individuals having a shared special interest in a particular topic. Such subgroups are known by different names, such as special interests groups, affinity groups or birds-of-a-feather groups, and make it easier for each individual to interact on a face-to-face level with a smaller group of individuals, each sharing or contributing knowledge or insights on a particular topic while benefiting from knowledge or insights received from other individuals in the same smaller group.

There are no limits on the topics around which conference organizers may wish to organize special interest groups. If the major presentations to be made at the conference pertain to a particular major topic (for example, computer network technology), the conference organizers may wish to organize special interest groups for specific subtopics within the major topic (for example, user security concerns, advances in cloud computing, the role of open source code, etc.).

The conference organizers may even wish to organize special interest groups around topics that have nothing to do with the primary topic of the conference as way of providing temporary stimulating diversions for the conference attendees. For example, where the major topic of the conference is a particularly serious topic, the conference organizers may wish to organize special interest groups for "lighter" topics, such as videogaming, sports, cooking, etc.

The problem facing conference organizers is that they seldom know enough about the individuals who will be attending the conference to know what special interests each individual may have and whether the individual is interesting in talking to others that may have the same special interests.

BRIEF SUMMARY OF THE INVENTION

The invention may be embodied as a method for establishing subgroups within a group of participants. A profile is established for each participant in the group. The profile includes contribution attributes and preference attributes specific to the participant. For each possible pair of participants in the group, the contribution attributes of one participant in the pair is combined with preference attributes of the other participant in the pair to generate three scores for each participant. The first generated score is a contribution score indicative of the overall contribution the participant could provide to the other participant in the pair. The second generated score is a benefit score indicative of the overall benefit the participant could receive from the other participant in the pair. The third generated score is a mutual benefit score combining the benefit scores of both participants in the pair. Once the scoring is complete, participants are assigned to subgroups as a function of participant and mutual benefit scores.

The invention may also be embodied as a computer program product comprising a computer-usable medium having computer-usable program instructions embodied therein. The program instructions, when loaded into and executed by a computer, cause the computer to perform a method of establishing subgroups within a group of participant. The computer-usable program instructions include program instructions configured to establish a profile for each participant in the group where the profile includes contribution attributes and preference attributes specific to the participant. Other program instructions are configured, for each possible pair of participants in the group, to combine the contribution attributes of one participant in the pair with preference attributes of the other participant in the pair to generate three scores for each participant in the pair. A generated contribution score is indicative of the overall contribution the participant could provide to the other participant in the pair. A generated benefit score is indicative of the overall benefit the participant could receive from the other participant in the pair. A generated mutual benefit score combines the benefit scores of both participants in the pair. Finally, the computer program product includes program instructions configured to assign participants to subgroups as a function of participant contribution and mutual benefit scores.

The invention may also be embodied as a computer-implemented system for establishing subgroups within groups of participants. The computer-implemented system includes a participant profile register for storing a profile for each participant in the group, the profile including contribution attributes and preference attributes specific to the participant. The computer-implemented system further includes pairing logic for creating all possible pairs of participants having profiles stored within the participant profile register and score generating logic for, for each possible pair of participants, combining the contribution attributes of one participant in the pair with preference attributes of the other participant in the pair to generate three scores for each participant. The first generated score is a contribution sore indicative of the overall contribution the participant could provide to the other participant in the pair. The second generated score is a benefit score indicative of the overall benefit the participant could receive from the other participant in the pair. The third generated score is a mutual benefit score combining the benefit scores of both participants in the pair. The computer-implemented system further includes group assignment logic for assigning participants to subgroups as a function of participant contribution and mutual benefit scores generated by the score generating logic.

BRIEF DESCRIPTION OF THE SEVERAL VIEWS OF THE DRAWINGS

FIG. 1 is depiction of a group of participants with varied interests and assignments of those participants to subgroups based on shared or special interests.

FIG. 2 represents the structure of a participant profile.

DETAILED DESCRIPTION

Figure 3:
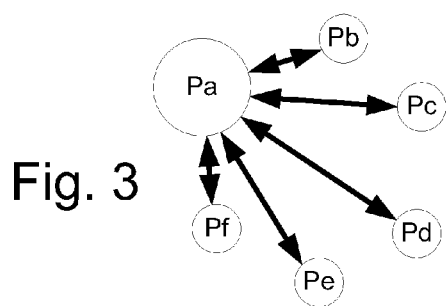
FIGS. 3-8 represents all possible pairings of a set of individuals (Pa, Pb, Pc, Pd, Pe, and Pf).
Figure 4:
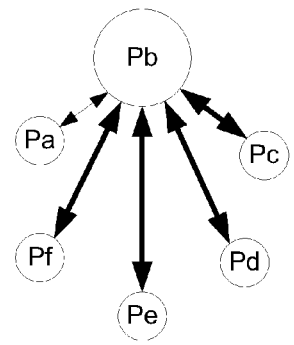
Figure 5:
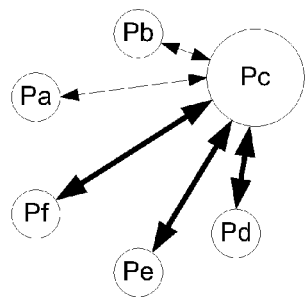
Figure 6:
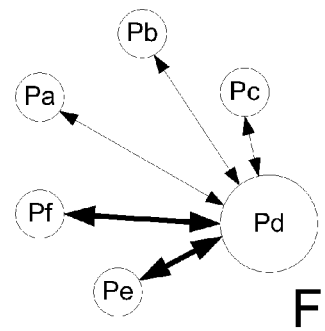
Figure 7:
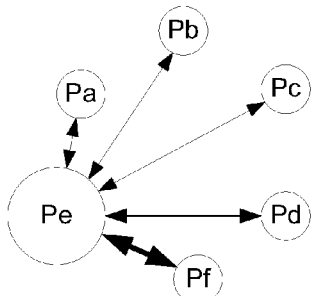
Figure 8:
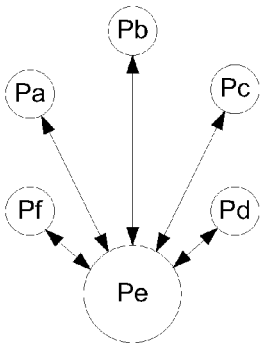

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer-usable or computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, the purpose of the present invention is to, beginning with a relatively large Group of individuals (Px) having different interests a, b and c, to identify special interest Subgroups A, B and C and to assign particular individuals to those Subgroups based on attributes of different individuals. Once the subgroups are formed, subgroup meetings may be scheduled to bring the members of each subgroup together.

The term "attribute" should be broadly construed as any characteristic of an individual that would bear on the individual's ability to either contribute something to a particular subgroup or to benefit in some way from participation in the subgroup. One obvious example of a contribution attribute would be an individual's level of expertise in the subgroup topic. A related, also obvious example of a benefit attribute would be another individual's level of interest in talking to other individuals who are known to have expertise in the subgroup topic.

Other contribution and benefit attributes may be less straightforward than the example given above. For example, if a first, prospective subgroup member is more interested in interacting in a subgroup with strangers rather than with the co-workers he or she sees most work days, then the organizational or physical address of prospective subgroup members would be considered a contribution attribute while the first member's own organizational or physical address coupled with the recorded interest in interacting with strangers would be considered a corresponding benefit attribute.

As can be seen from the examples given above, each contribution attribute is paired with a related benefit attribute with the contribution attribute being indicative of what the participant could contribute to the subgroup on a particular topic and the related benefit attribute being indicative of how the participant would be benefitted if another participant were to contribute to the subgroup on the particular topic.

Referring to FIG. 2, each participant in the group would be characterized by a participant profile 20 consisting of a set of contribution attributes 22a, . . . 22(n1), 22n and a set of corresponding benefit attributes 24a, . . . 24(n−1), 24n. Each of the contribution attributes and each of the benefit attributes would include a definition of the attribute and an associated score, the magnitude of which indicate the presence or absence of the attribute in the profiled participant. For example, if the contribution attribute were knowledge of a particular technical subject, the contribution attribute for an expert in that subject could have an associated score of 1 (or more) while the contribution attribute for someone with no significant knowledge of the subject could be a zero.

Where the contribution attribute is knowledge of a particular technical subject, the corresponding benefit attribute would be interest in interacting with another participant with expertise in the subject. For such a benefit attribute, the associated score might be 1 or more indicating levels of interest in interacting with experts in the subject or 0 indicating a lack of interest in interacting with experts. Depending on the attributes, negative scores might be employed. For example, in the example above, if a participant prefers not to interact with experts, the associated benefit score for that participant may be set to a negative number.

Information required to create participant profiles may come from a number of sources. Where subgroup topics are related to primary topics to be covered in a conference, conference organizers may define at least some of the contribution attributes and related benefit attributes in the profile. Conference participants may suggest subgroup topics with contribution attributes and related benefit attributes being derived from suggested topics by the organizers.

While it might be possible for conference organizers to assign scores to contribution attributes and benefit attributes, that is not a preferred approach since it can amount to guesswork by the organizers. The preferred approach would be to elicit the necessary information directly from participants through the use of surveys and questionnaires completed by the participants. Directly-elicited information might, of course, be supplemented with other information considered reliable, such as a participants job classification, business address or educational pedigree.

In accordance with the invention, subgroup assignments are made in a process that requires that a set of scores first be generated for every possible pairing of participants in the entire group. FIGS. 3-8 illustrate, for a group having six members, all the possible pairings for each member of the group. Referring to FIG. 3, for example, group member Pa can be paired with other members of the group in five different pairings; i.e., Pa-Pb, Pa-Pc, Pa-Pd, Pa-Pe and Pa-Pf, Pb can be paired with other members in pairings Pb-Pa, Pb-Pc, Pb-Pd, Pb-Pe and Pb-Pf, etc. For a six member group, pairing each member with every other member yields 30 pairs. However, of those 30 pairs, only 15 pairs are unique, since pairing participant Pa with participant Pb is the equivalent of pairing participant Pb with participant Pa. The unique pairings among the six members in the group are represented by bolded double-headed arrows in FIGS. 3-8.

In the scoring process, three different scores are calculated for each member of a pair. A contribution score represents the overall contribution a first member of the pair could make to the second member of the pair, taking all of the contribution attributes of the first member and all of the benefit attributes of the second member into account. A benefits score represents the overall benefit the first member would receive from the second member taking all of the contribution attributes of the second member and all of the benefit attributes of the first member into account. Finally, a mutual benefits score represents the sum of the contribution score and the benefit score for a member.

Figure 9:
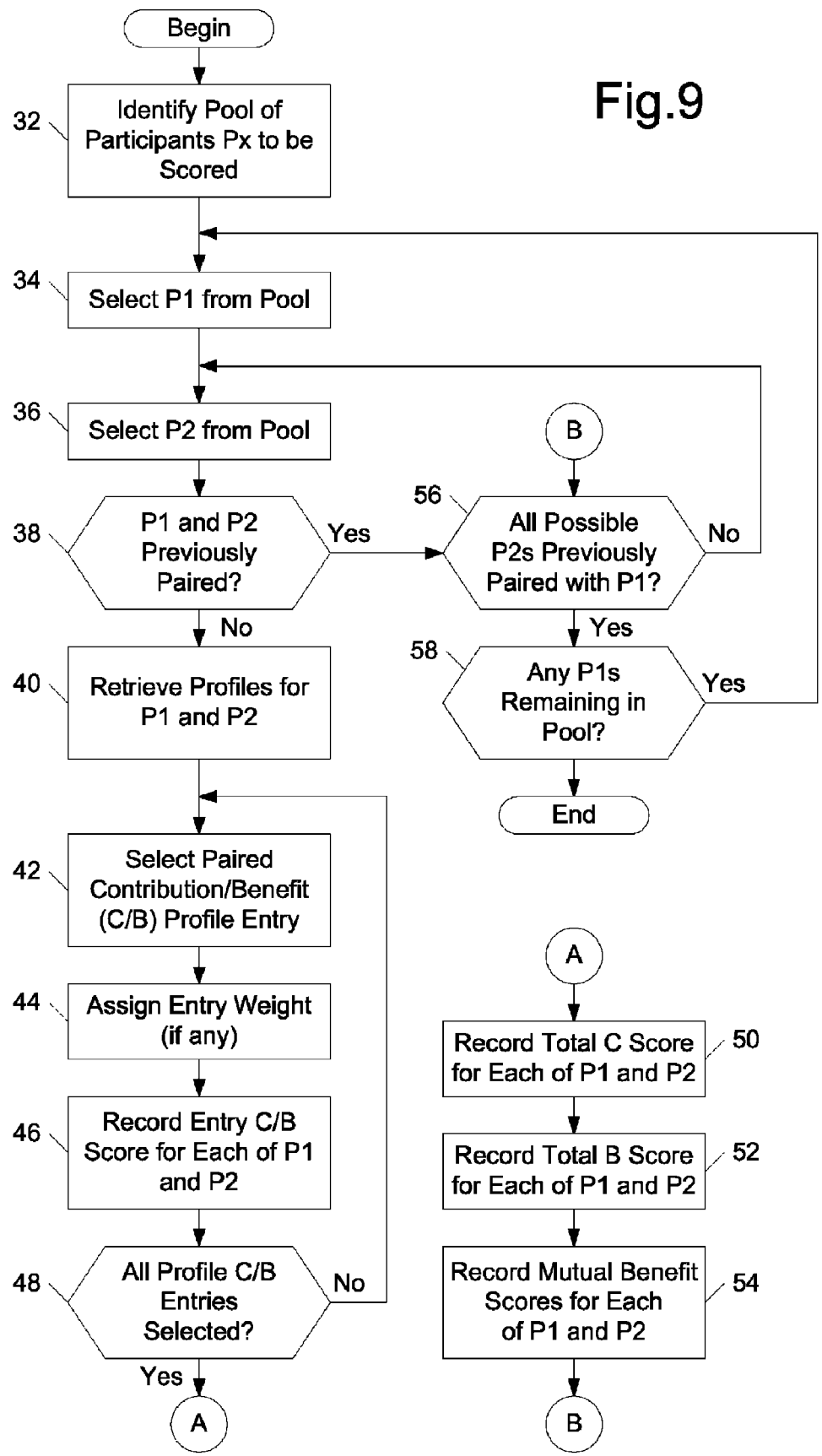
FIG. 9 is a flowchart showing operations performed in calculating contribution, benefit and mutual benefit scores for participants in different pairings of participants.

FIG. 9 is a flow chart of the scoring process for a pool of participants, each having an established profile. When the scoring process is initiated, the pool of participants Px to be scored is identified in operation 32. Any potential participant lacking a contribution/benefit profile is necessarily excluded from the pool.

Once the pool of participants eligible for the scoring process has been established, a first participant P1 is selected from the pool in an operation 34. A second participant is selected from the pool in an operation 36. Because there is a possibility that the participant identified as participant P2 would have already been selected for the role of participant P1 in a prior iteration of the scoring process, a determination 38 must be made whether the two currently identified participants had already been paired in a prior iteration of the scoring process.

Assuming the two currently identified participants had not been previously paired, the profiles for both participants are retrieved from storage in an operation 40 and the first paired contribution/benefit profile entry in each participant's profile is selected in an operation 42. Depending on the reasons for forming subgroups, it is possible that conference organizers may wish to have some contribution/benefit entries given more weight in the scoring process than others. Accordingly, a check is made to determine whether the selected entry is one to which extra weight should be given and the weighting (if any) is provided in an operation 44.

An entry contribution score for each participant in the pair is obtained by summing the score assigned to one participant's contribution entry with the score assigned to the other participant's corresponding benefit entry. The same score is assigned to the corresponding benefit entry for the other participant. For example, if a score of +2 were to be calculated for a particular contribution attribute of participant P1, then a score of +2 would also be assigned to the corresponding benefit attribute of participant P2.

The calculated scores for the specific profile entries being considered are recorded for each of the paired participants P1 and P2 in an operation 46 and a determination 48 is made whether all contribution/benefit entries in the participant profiles have been scored. If any profile entry has not been scored, the process loops back to the input of operation 42 where one of the remaining unscored profile entries is selected and the scoring operations are performed.

When operation 48 shows that all of the contribution/benefit profile entries have been considered in the scoring process, a total of the contribution scores for each of the paired participants is recorded in an operation 50 while a total of the benefit scores for each of the paired participants is recorded in an operation 52. A mutual benefit score is derived by summing the total benefit scores of both of the paired participants. The same mutual benefit score is then recorded for each of the paired participants in an operation 54.

Operations 40-54 are initiated only where operation 38 determines that the two selected participants had not previously been paired. If operation 38 determines that the two selected participants were previously paired, the scoring operations described above would already have been completed in processing the previous pairing. In such a situation, a further operation 56 must be made whether the first participant P1 has been paired with every other participant P2. If one or more participants P2 have yet to be paired with the selected participant P1, the program loops back to operation 36 where a different participant P2 is selected and another iteration of operations 38-56 is performed. If, however, operation 56 shows that P1 has already been paired with all other participants in the pool, an additional operation 58 is performed to determine whether there are still participants who haven't been selected as participant P1. If there are, the program loops back to operation 34 and one of those participants is selected as P1 and the entire scoring cycle of operations 36-58 is re-initiated.

Once operation 58 shows that every participant in the pool has been considered for the role of participant P1 (which necessarily implies that every participant in the pool has been paired with every other participant in the pool), the scoring process ends. At the end of the scoring process, a total contribution score, a total benefit score and a total mutual benefit score will have been calculated and recorded for each of the participants.

Figure 10:
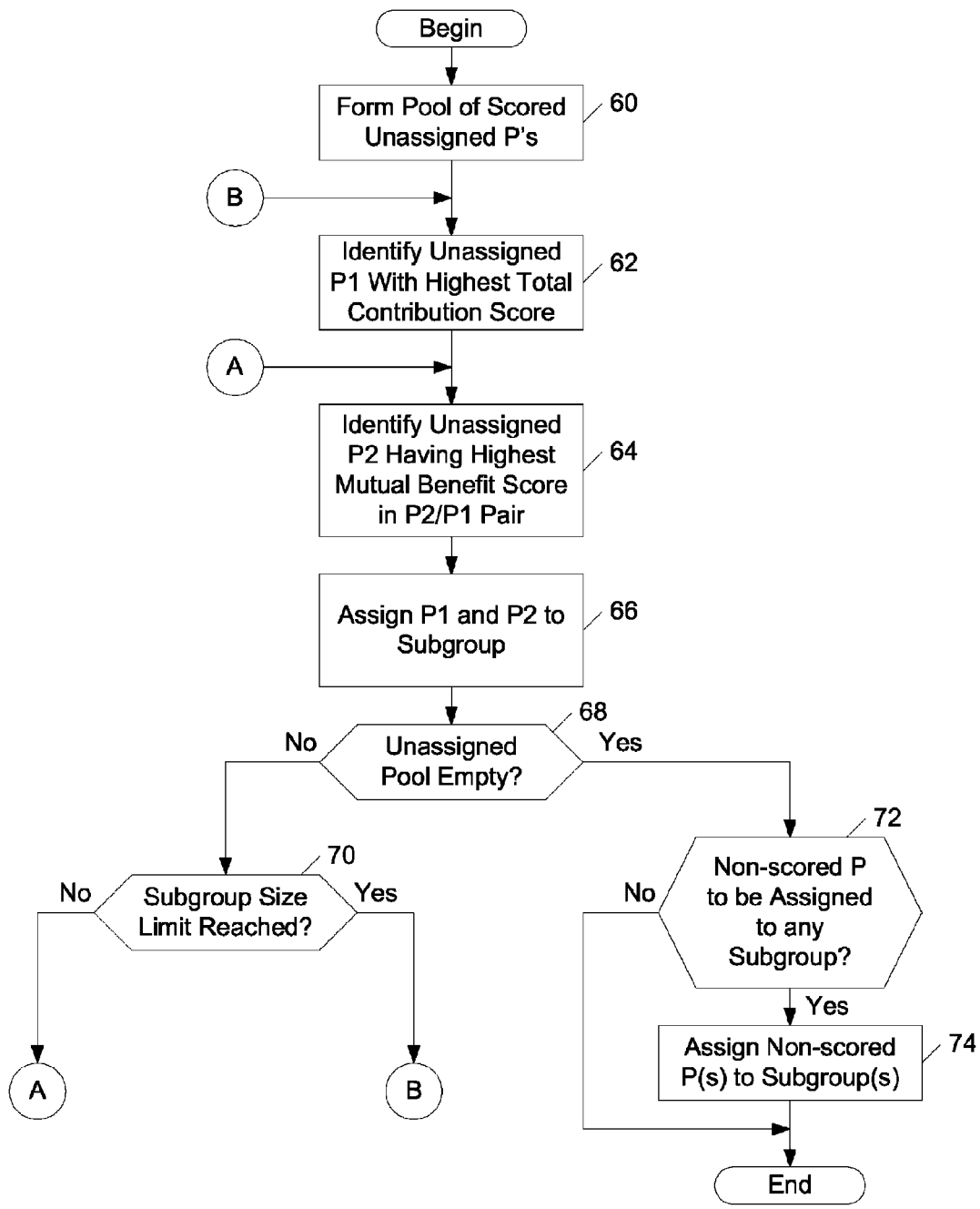
FIG. 10 is a flowchart showing operations performed in assigning participants to subgroups based on the calculated scores.

The recorded scores are used in a subgroup assignment process illustrated in FIG. 10. The initial step 60 in the process is to assign all participants for whom scores are recorded to a pool of unassigned participants. The scores for all participants in the unassigned pool are reviewed in operation 62 to identify the participant P1 having the highest total contribution score. Once P1 is identified, the recorded mutual benefit scores of other participants in the unassigned pool are reviewed in an operation 64 to identify the participant having the highest mutual benefit score when P2 is paired with P1. Both of the identified participants P1 and P2 are then assigned to a subgroup in an operation 66, necessarily removing them from the pool of unassigned participants.

A check is made in operation 68 whether participants remain in the unassigned pool, which they obviously will on a first pass through the subgroup assignment process. If the pool is found not to be empty, then in one embodiment of the invention, a determination 70 is made whether the subgroup to which participants were just assigned has reached a predetermined size. If the subgroup hasn't reached a predetermined size, the mutual benefit scores for participants remaining in the pool are considered in another iteration of operation 64 to identify the next participant P2 having the highest remaining mutual benefit score when paired with participant P1. Note that, on this iteration of operation 64, the identity of participant P1 remains unchanged while a different participant P2 is identified. The newly identified participant P2 is assigned to the same subgroup as the previously identified participant P1 in another iteration of operation 66.

The program loop consisting of operations 64, 66, 68 and 70 is iterated repeatedly until operation 68 shows that the pool of unassigned participants is empty (i.e., that all participants have been assigned to a subgroup) or (assuming the pool is found not to be empty) until operation 70 indicates that the subgroup being formed has reached a predetermined size limit. If operation 70 shows the subgroup size limit has been reached, formation of a new subgroup is initiated by performing another iteration of operation 62 to review the total contribution scores for all participants remaining in the pool and identify the still-unassigned participant having the highest total contribution score.

The newly identified still-unassigned participant will play the role of participant P1 in additional iterations of the subgroup assignment process. The subgroup assignment process will continue until all of the participants originally in the unassigned pool have been assigned to a subgroup. When operation 68 indicates all participants have been assigned to a subgroup, in one embodiment of the invention, an additional operation 72 is performed to determine whether any non-scored participant should be assigned to one of the previously formed subgroups. There may be a number of reasons for assigning a non-scored participant to a formed subgroup. As one example, conference organizers may wish to have individuals assigned to subgroups as moderators who will be expected to maintain some control over discussions that take place within the subgroups. As another example, conference organizers may wish to assign a particular individual to a particular subgroup in recognition of that individual's known expertise in the subgroup topic. If any such non-scored participants exist, the subgroup formation process is completed by assigning them to the appropriate subgroups in an operation 74. Obviously, if no such non-scored participants exist, operation 74 is bypassed.

The end result of the subgroup formation process will be two or more subgroups with each group consisting of a "seed" participant having the highest total contribution score of any of the participants in the subgroup and at least one (but presumably more) additional participants having high mutual benefit scores relative to the "seed" participant.

Once the subgroups have been formed, the conference organizers have several options for implementing subgroup sessions. The conference organizers may elect to specifically assign conference participants to particular subgroup sessions, leaving the participants little or no option about whether they participate in a particular session. As an alternative, conference organizers may send participants invitations to participate in a specific subgroup session without explicitly barring them from participating in other subgroup sessions. As another alternative, conference organizers may simply announce a schedule for subgroup sessions, leaving it up to participants which sessions they attend. Clearly, the less control conference organizers exercise, the greater the chances that participants won't end up in a subgroup to which they were nominally assigned.

Depending on the nature of a conference and the wishes of the conference organizers, variations on the scoring and subgroup formation processes may be implemented. For example, if alternative (or "competing") topics were to be covered at a conference, more tightly focused subgroups might be defined by employing a scoring process and related subgroup formation process of the type illustrated in FIGS. 11 and 12.

Figure 11:
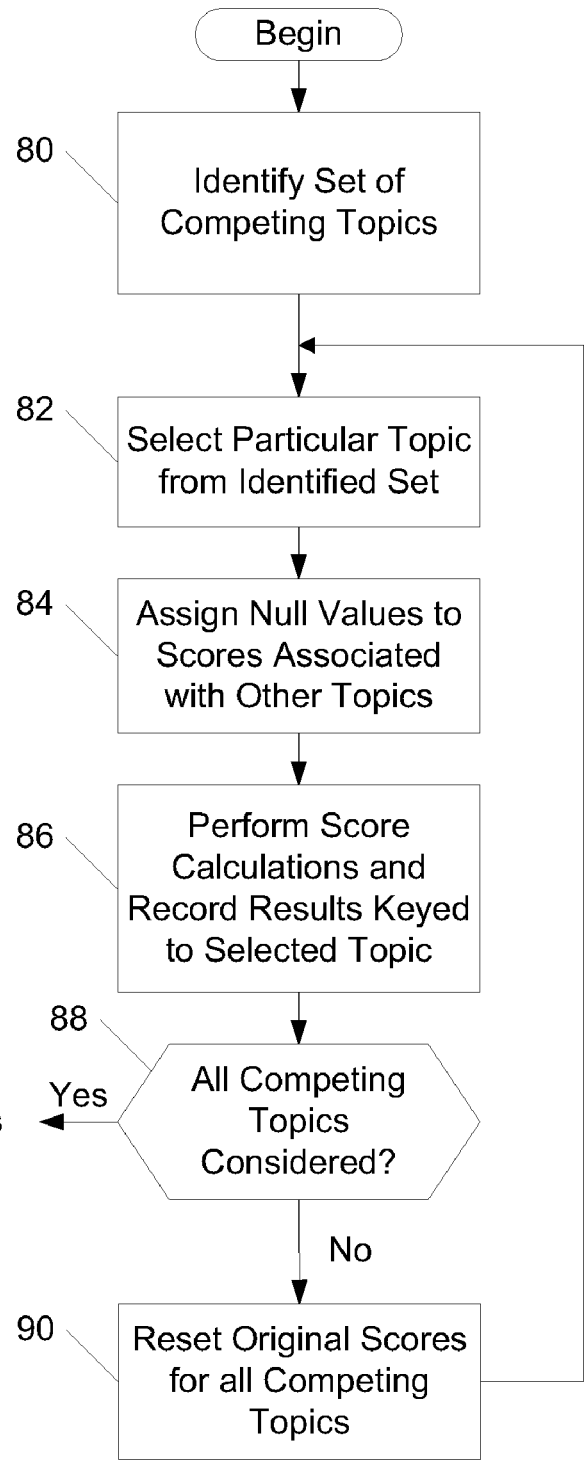
FIG. 11 is a flowchart of an alternate process for calculating contribution, benefit and mutual benefit scores.

Referring first to FIG. 11, an operation 80 would be performed to identify alternate (or competing) contribution/benefit entries or topics in the participant profiles. An easily understood example of competing topics would be disparate leisure time activities, such as golfing, fishing, rock climbing, etc. Once the set of competing topics is identified, one of those topics is selected in an operation 82 and null values are temporarily assigned to all of the other competing topics in an operation 84. The previously-described scoring operations are then performed using the modified scores. The end result will be a set of total contribution scores, total benefit scores and mutual benefit scores for all of the participants. The set will, however, be specific to the one competing topic (e.g., golf) to which null values had not been assigned. When the scoring is complete for the non-nulled topic, a determination 88 is made whether all of the competing topics have been considered in the scoring process. If not all of the competing entries have been considered, the original profile scores are reset in operation 90 before beginning a new iteration of the process by selecting a different competing topic in operation 82. The process defined by operations 82-90 is repeated until scores for each of the competing topics have been established. The end result will be multiple sets of score, with each set being associated with one of the competing topics.

Figure 12:
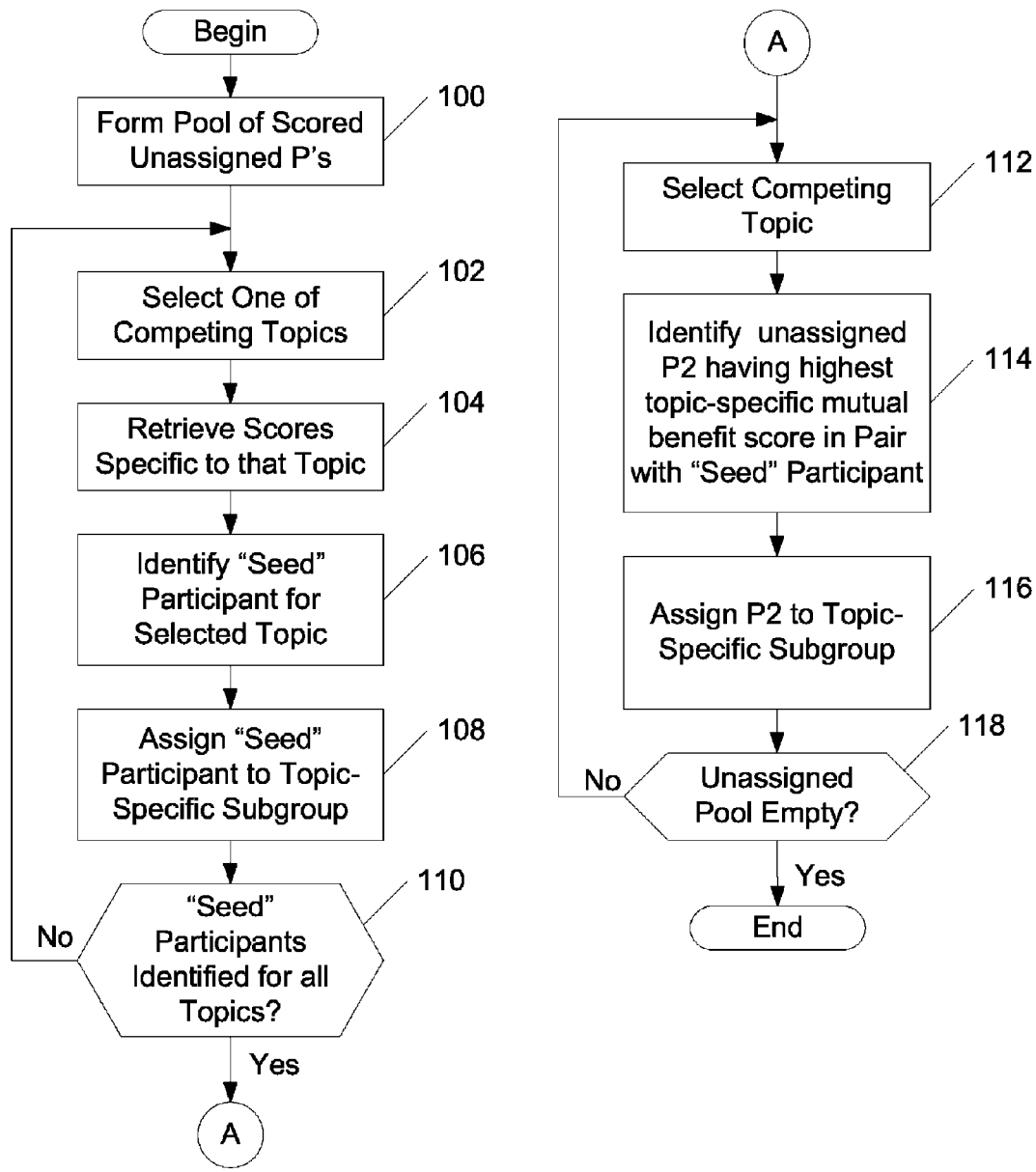
FIG. 12 is a flowchart of a operations performed in assigning participants to subgroups when the alternate process shown in FIG. 11 is employed.

A group formation process defined by FIG. 12 is initiated once the multiple sets of scores have been determined. The initial step 100 in the process is to form a pool consisting of unassigned participants for which scores have been generated. One of the competing topics is selected in an operation 102 and the previously calculated scores specific to that topic are retrieved in an operation 104. The topic-specific total contribution scores for all unassigned participants are evaluated to identify (in operation 106) the unassigned participant having the highest total contribution score for the selected topic. The identified participant is selected as the "seed" participant for the selected topic and is assigned in operation 108 to a subgroup specific to the selected topic. Assignment of the "seed" participant necessarily removes the assigned participant from the pool of unassigned participants. An operation 110 determines whether all of the competing topics have been considered; i.e., whether "seed" participants have been selected for all of the topics. If not, the next topic is selected and the "seed" participant for that topic is identified and assigned to the topic-specific subgroup. Operations 102-110 are repeated until "seed" participants are assigned to all of the competing topics.

Once all of the "seed" participants have been selected, a process of populating the topic-specific subgroups begins by selecting one of the topics in an operation 112. The still-unassigned participant having the highest topic-specific mutual benefit score relative to the "seed" participant is identified in an operation 114 and assigned to the topic-specific subgroup in an operation 116, which removes the participant from the pool of unassigned participants.

If an operation 118 shows that participants have yet to be assigned to one of the topic-specific subgroups, the next topic is selected in an iteration of operation 112 and a still-unassigned participant having the highest mutual benefit score for the newly selected topic relative to the "seed" participant for the newly selected topic is identified in an operation 114 and assigned to the topic-specific subgroup. The group formation process is ended when operation 118 indicates there are no participants waiting to be assigned to a subgroup. By selecting participants to be added to topic-specific subgroups on a rotating basis, it is considered likely that each subgroup will be populated with participants most intensely interested in the particular topic. Moreover, the subgroups will be roughly equal in size.

Figure 13:
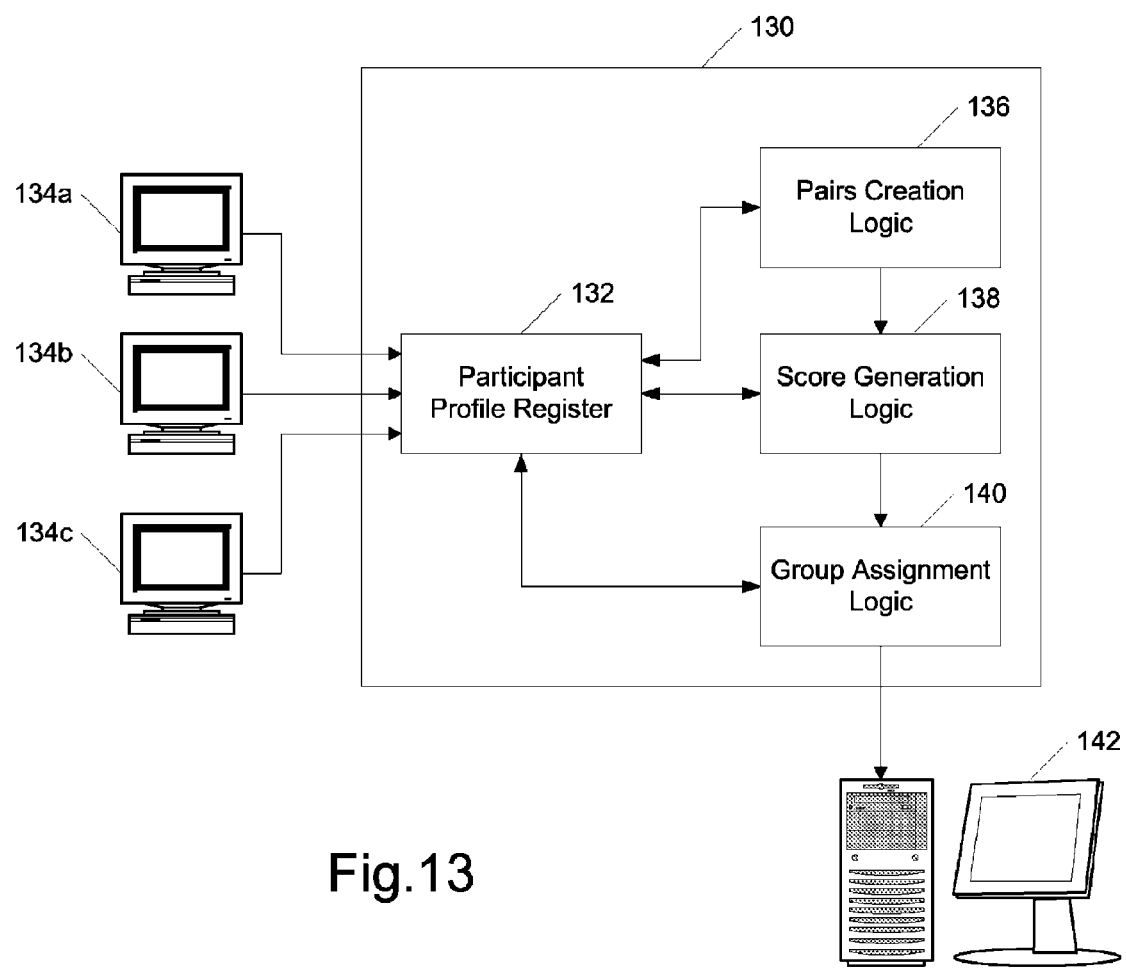
FIG. 13 is schematic representation of the components in a dedicated hardware implementation of the invention.

The invention may be implemented using different technologies, such as by using special purpose hardware components of the type shown in FIG. 13. The system apparatus 130 includes a participant profile register for storing generated participant profiles. As has already been noted, the data from the profiles may be derived from various sources, including using questionnaires completed by participants incident to the conference registration process or by performing data mining using participant address or job-related information. The three input terminals 134*a*, 134*b*, 134*c* could be used directly by participants or by others obtaining the participant-specific information more indirectly. Pairs creation logic 136 is included in the apparatus to generate the pairing information required by the scoring process. The pairs creation logic provides an input the score generation logic that performs the previously described scoring process. Finally, group assignment logic 140 is used to assign participants to particular subgroups. Outputs from group assignment logic will be provided back to the participant profile register so that group assignment information will be retained in each participant's stored profile. The same outputs may be provided to an administrator terminal 142 for use in generating invitations or performing other operations related to the actual implementation of the subgroups.

Figure 14:
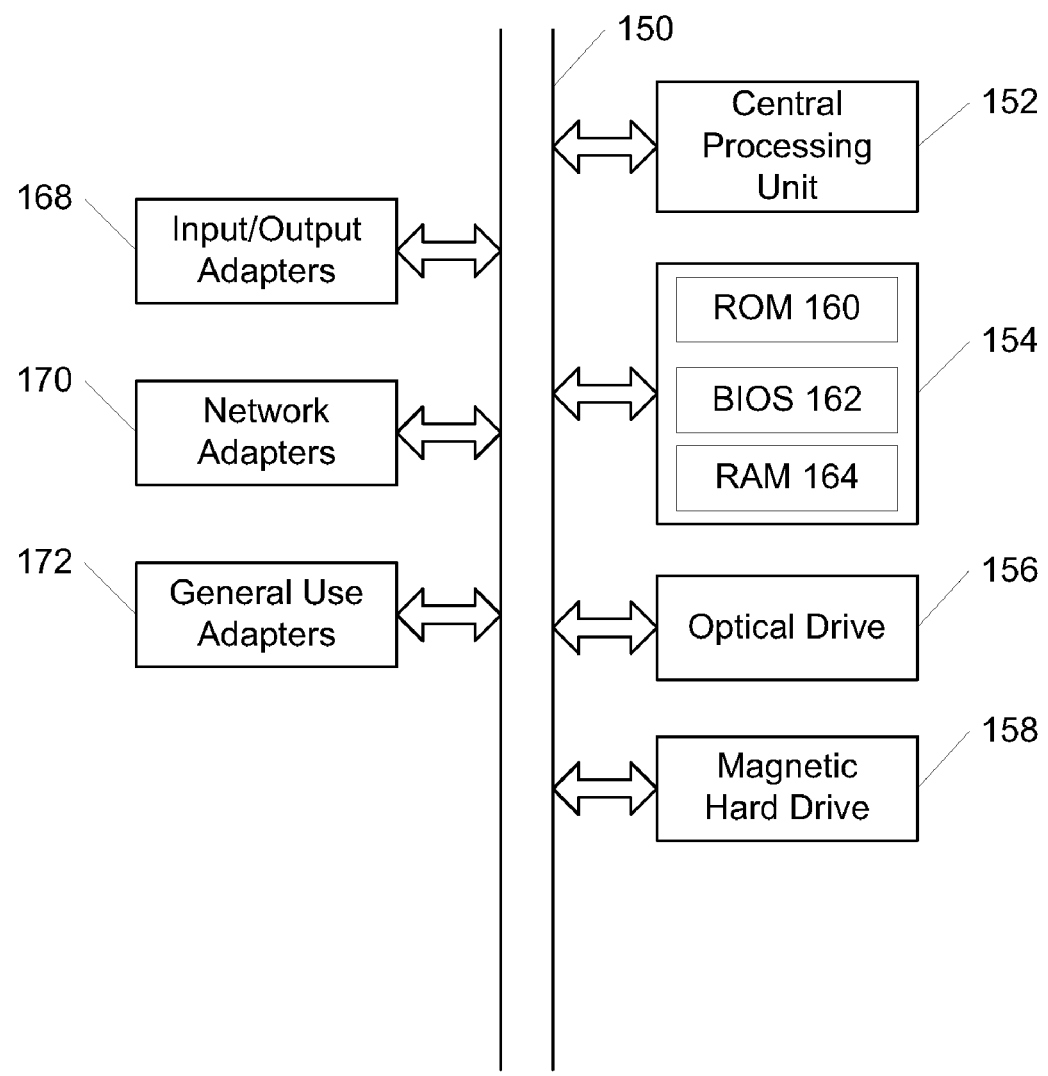
FIG. 14 is schematic representation of a general purpose computer system that, when properly programmed, can implement the invention.

FIG. 14 is the physical infrastructure of a general purpose computer system that can implement the methods described above. The computer system includes an internal system bus 150, a system processor 152, internal memory components 154 and one or more "external" memory components, such as an optical drive 156 and a magnetic hard drive 158. The internal memory 154 includes specific types of memory such as read only memory (ROM) 160, basic input/out system (BIOS) memory 162 and random access memory (RAM) 164. The BIOS 162 stores configuration information for the computer system and basic routines used to control the transfer of information among the components of the computer system.

Drives, such as optical drive 156 and hard drive 158, provide non-volatile storage for applications and processes that execute in the computer system and for data used in and/or generated by those applications and processes.

The computer system also includes a significant number of input/output (I/O) adapters 168 that provide interfaces between a variety of input/output devices and the remainder of the computer system. Common examples of input/output devices include keyboards, pointing devices, monitors and printers.

The computer system can be connected to other systems through network adapters 170, which may support wired or wireless network connections. Finally, the computer system may include what are characterized as general use adapters 172 that can be used for a number of different purposes. For example, USB (Universal Serial Bus) adapters can be used to connect typical input/output devices (such as keyboards, monitors, etc.), auxiliary memory devices, such as flash memory cards, portable hard drives and even high capacity magnetic hard drives, wireless network transceivers and many other kinds of devices to the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of establishing subgroups of participants within a group of participants, comprising:
    establishing a profile for each participant in the group, said profile including contribution attributes and preference attributes specific to said participant;
    for each possible pair of participants in the group, combining the contribution attributes of one participant in the pair with preference attributes of the other participant in the pair to generate, for each participant,
        a contribution score indicative of the overall contribution the participant could provide to the other participant in the pair,
        a benefit score indicative of the overall benefit the participant could receive from the other participant in the pair, and
        a mutual benefit score combining the benefit scores of both participants in the pair; and
    assigning participants to subgroups as a function of participant contribution and mutual benefit scores, wherein assigning participants to subgroups as a function of participant contribution and mutual benefit scores further comprises:
    identifying a first participant having the highest contribution score and a second participant having the highest mutual benefit score between itself and said first participant;
    assigning said first participant and said second participant to a group;
    identifying another participant having the highest mutual benefit score between itself and participants already assigned to said group and assigning said another participant to said group; and
    repeating the preceding operation for one or more additional participants.

2. A method according to claim 1 wherein establishing a profile for each participant in said group, said profile including contribution attributes and preference attributes specific to said participant, further comprises weighting one or more contribution attributes and preference attributes differently than other contribution attributes and preference attributes.

3. A method according to claim 1 wherein repeating the preceding operation for one or more additional participants further comprises performing said operation until a predetermined number of participants have been assigned to said group.

4. A method according to claim 3 further comprising assigning one or more participants to said group independently of contribution attributes or preference attributes.

5. A method according to claim 3 further comprising starting a new group by:
    identifying a still unassigned first participant having the highest contribution score of all unassigned participants and a still unassigned second participant having the highest mutual benefit score between itself and the identified, still-unassigned first participant; and
    assigning said still unassigned first participant and said still unassigned second participant to said new group.

6. A method according to claim 5 further comprising assigning one or more participants to said new group independently of contribution attributes or preference attributes.

7. A computer program product comprising a non-transitory computer-readable storage medium having computer readable program instructions embodied therein, said program instructions, when loaded into and executed by a computer, causing the computer to perform a method of establishing subgroups of participants within a group of participants, said program instructions comprising:
    program instructions configured to establish a profile for each participant in the group, said profile including contribution attributes and preference attributes specific to said participant;
    program instructions configured to, for each possible pair of participants in the group, combine the contribution attributes of one participant in the pair with preference attributes of the other participant in the pair to generate, for each participant,
        a contribution score indicative of the overall contribution the participant could provide to the other participant in the pair,
        a benefit score indicative of the overall benefit the participant could receive from the other participant in the pair, and
        a mutual benefit score combining the benefit scores of both participants in the pair; and
    program instructions configured to assign participants to subgroups as a function of participant contribution and mutual benefit scores, wherein said program instructions configured to assign participants to subgroups as a function of participant contribution and mutual benefit scores further comprise:
    program instructions configured to identify a first participant having the highest contribution score and a second participant having the highest mutual benefit score between itself and said first participant;
    program instructions configured to assign said first participant and said second participant to a group;
    program instructions configured to identify another participant having the highest mutual benefit score between itself and participants already assigned to said group and assign said another participant to said group; and
    program instructions configured to repeat the preceding operation for one or more additional participants.

8. A computer program product according to claim 7 wherein program instructions configured to establish a profile for each participant in said group, said profile including contribution attributes and preference attributes specific to said participant, further comprises program instructions configured to weight one or more contribution attributes and preference attributes differently than other contribution attributes and preference attributes.

9. A computer program product according to claim 7 wherein program instructions configured to repeat the preceding operation for one or more additional participants further comprise program instructions configured to perform said operation until a predetermined number of participants have been assigned to said group.

10. A computer program product according to claim 9 further comprising program instructions configured to assign one or more participants to said group independently of contribution attributes or preference attributes.

11. A computer program product according to claim 9 further comprising additional program instructions configured to start a new group, said additional program instructions comprising:
   program instructions configured to identify a still unassigned first participant having the highest contribution score of all unassigned participants and a still unassigned second participant having the highest mutual benefit score between itself and the identified, still-unassigned first participant; and
   program instructions configured to assign said still unassigned first participant and said still unassigned second participant to said new group.

12. A computer program product according to claim 11 further comprising program instructions configured to assign one or more participants to said new group independently of contribution attributes or preference attributes.

13. An apparatus for establishing subgroups of participants within a group of participants, comprising:
   a system processor;
   a memory comprising a participant profile register for storing a profile for each participant in the group, said profile including contribution attributes and preference attributes specific to said participant;
   pairing logic for creating all possible pairs of participants having profiles stored in said participant profile register;
   score generating logic for, for each possible pair of participants in the group, combining the contribution attributes of one participant in the pair with preference attributes of the other participant in the pair to generate, for each participant,
      a contribution score indicative of the overall contribution the participant could provide to the other participant in the pair,
      a benefit score indicative of the overall benefit the participant could receive from the other participant in the pair, and
      a mutual benefit score combining the benefit scores of both participants in the pair; and
   group assignment logic for assigning participants to subgroups as a function of participant contribution and mutual benefit scores generated by said score generating logic, wherein said group assignment logic further comprises:
   logic for identifying a first participant having the highest contribution score and a second participant having the highest mutual benefit score between itself and said first participant;
   logic for assigning said first participant and said second participant to a group;
   logic identifying another participant having the highest mutual benefit score between itself and participants already assigned to said group and assigning said another participant to said group; and
   logic for causing the preceding operation to be repeated for one or more additional participants.

14. The apparatus according to claim 13 further comprising attribute-weighting logic for weighting one or more contribution attributes and preference attributes in a profile to be stored in said participant profile register differently than other contribution attributes and preference attributes.

15. The apparatus according to claim 13 wherein said logic for causing the preceding operation to be repeated for one or more additional participants further comprises termination logic for terminating the repetitions when a predetermined number of participants have been assigned to said group.

16. The apparatus according to claim 15 further comprising logic for assigning one or more participants to said group independently of contribution attributes or preference attributes.

17. The apparatus according to claim 15 further comprising logic for initiating the formation of a new group, said logic comprising:
   logic for identifying a still unassigned first participant having the highest contribution score of all unassigned participants and a still unassigned second participant having the highest mutual benefit score between itself and the identified, still-unassigned first participant; and
   assignment logic for assigning said still unassigned first participant and said still unassigned second participant to said new group.

* * * * *